Feb. 23, 1960  J. HILL-VENNING  2,925,763
CAMERA SHUTTERS

Filed March 7, 1955  5 Sheets-Sheet 1

INVENTOR
JOHN HILL-VENNING
By Wilkinson & Mawhinney
ATTY.

Feb. 23, 1960  J. HILL-VENNING  2,925,763
CAMERA SHUTTERS

Filed March 7, 1955  5 Sheets-Sheet 3

INVENTOR
JOHN HILL-VENNING
By Wilkinson & Mawhinney
ATTYS

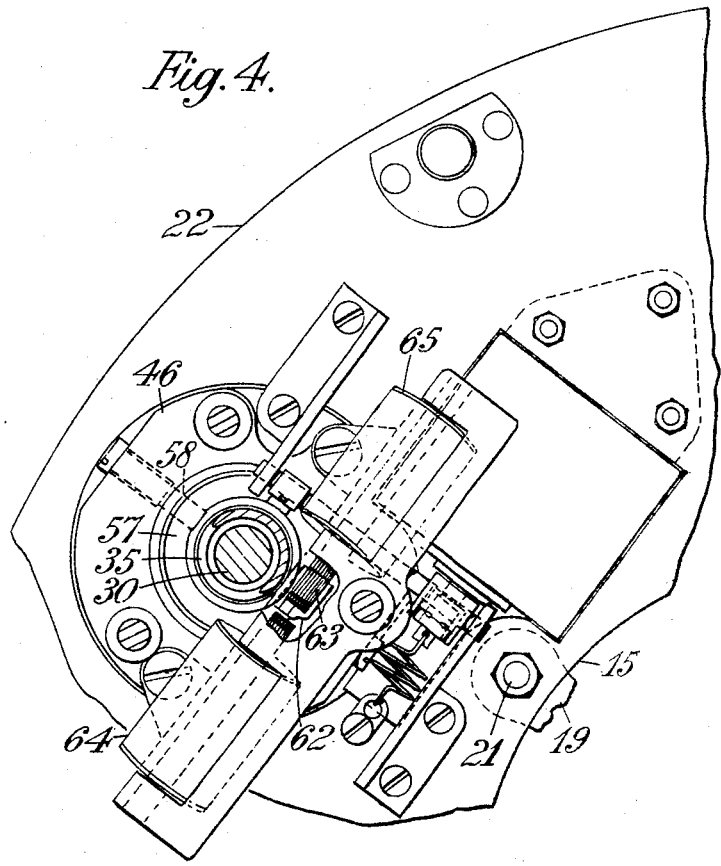

Feb. 23, 1960   J. HILL-VENNING   2,925,763
CAMERA SHUTTERS
Filed March 7, 1955   5 Sheets-Sheet 5
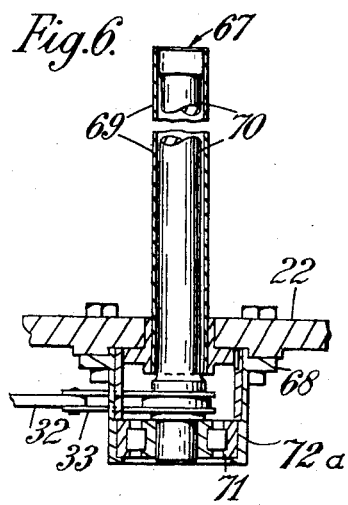
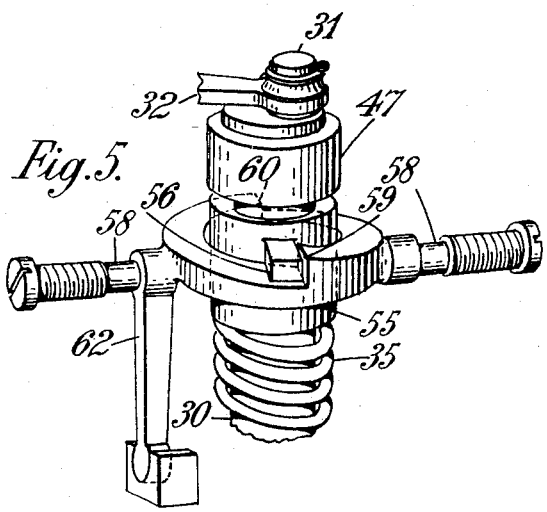
INVENTOR
JOHN HILL-VENNING
By Wilkinson & Mawhinney
ATTYS.

United States Patent Office 2,925,763
Patented Feb. 23, 1960

2,925,763
CAMERA SHUTTERS

John Hill-Venning, Weybridge, England, assignor to Peto Scott Electrical Instruments Limited, Weybridge, England, a British company Application March 7, 1955, Serial No. 492,420

3 Claims. (Cl. 95—63)

This invention comprises improvements in or relating to camera shutters.

The invention relates to shutters of the kind in which pivoted blades cover the shutter opening and the shutter is opened by swinging the blades outwards and closed by returning them. Shutters of this type operate at speeds of up to 1/500 of a second when made of a size suitable for small hand cameras, but for shutters such as are required for aerial survey work, opening and closing movements of the requisite high efficiency are difficult to achieve owing to the substantial inertia of the operating parts, which with normal types of actuating mechanism under the influence of a spring, leads to unduly high impact forces at the termination of their movement and jeopardises the life of the shutter.

It is an object of the present invention to provide a mechanism by which such impact of the parts at the end of the stroke is minimised.

According to the present invention in a camera shutter of the kind described the shutter-blade operating mechanism, in addition to the usual shutter-operating means, has a centering spring which assists the initial parts of the opening and closing movements of the blades and resists the latter parts of these movements. Although the spring has been referred to as a centering spring, it will be appreciated that this is merely a descriptive term and the spring is not intended to hold the shutter-blades in the centre of their movements, although its force tends always to be directed toward the centre, or somewhere near the centre, of the movement. The effect of the spring is to accelerate the initial part of the blade movement, and to decelerate the latter part, thus assisting the blades to come to rest without appreciable shock. Indeed the shutter-operating means need only have enough power to overcome the maximum operating friction of the parts, and the power which is stored in the centering spring towards the ends of the movement suffices to give the requisite acceleration to the blades when the shutter is released. The momentum thus imparted to the blades, is returned to the centering spring at the ends of the movements instead of being wasted in shock, and is thus stored again ready for the next movement.

The following is a description by way of example of one construction in accordance with the invention:

In the accompanying drawings Figure 1 is a side elevation of the shutter with parts broken away to show certain features of the internal construction;

Figure 4 is a section upon the line 4—4 of Figure 3 looking in the direction of the arrows;

Figure 5 is a detail in perspective of a release cam, and

Figure 6 is a detail showing the centering torque tubes, in a section upon the line 6—6 of Figure 1.

Figure 2:
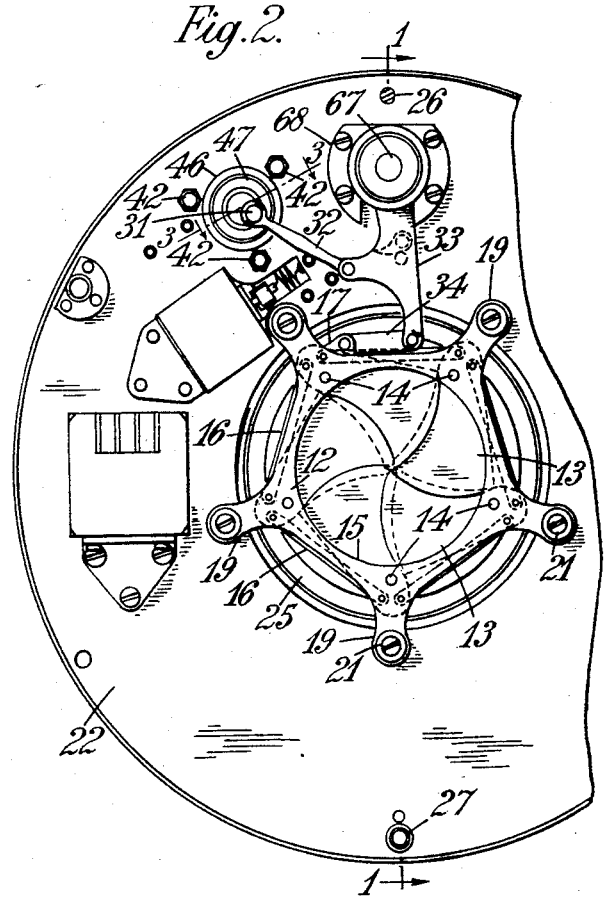
Figure 2 is a section upon the line 2—2 of Figure 1 looking in the direction of the arrows.

The shutter about to be described comprises two pentagonal frame-plates 11, 12 between which are mounted five blades 13 at pivot points 14 equidistantly spaced around a shutter-aperture 15 in the centre of the plates, the blades being of such form that they can be swung about their pivot points toward the centre of the aperture, where they will overlap one another as shown in Figure 2 and so obturate the shutter in known manner. The blades are all connected together by links 16 which extend tangentially between them, and one of the blades carries an outwardly directed operating lug 17. Thus movement of the lug 17 in one direction will open all the blades simultaneously, and in the other direction will close them.

The plates 11, 12 carry lugs 18, 19 which extend from them outwardly and are kept in line and spaced apart from one another by spacing members 20 through which pass bolts 21 by which they are secured to a main plate 22. On the plate 22 in front of the shutter frame plates 11, 12 there is a front casing 23 which supports a lens-mount 24 in front of the shutter opening 15. Behind the main plate 22 is a rear casing 24 which supports a rear lens-mount 25, the shutter plates 13 working between the two lens-mounts. The main plate 22 and the front and rear casings 23, 24 are held together by three equidistant bolts and nuts 26 and additionally at intermediate points by hollow studs 27 which serve also to secure the shutter to the camera with which it is to be used.

Behind the main plate 22 of the shutter, there is mounted a shutter-operating mechanism. This comprises a spindle 30 which is mounted in bearings in a bracket secured to the back of the shutter-plate so that the spindle is at right angles to the shutter-plate, where it carries a crank 31. The crank is connected by a connecting rod 32 to a rocker arm 33, the proportion of the parts being such that the rocker arm is reciprocated through an angle of about say fifteen or twenty degrees when the crank 31 is rotated. The end of the rocker arm is connected by link 34 to the movable blade-operating lug 17 and therefore, if the crank is rotated, the blades 13 will be moved alternately in and out.

Figure 3:
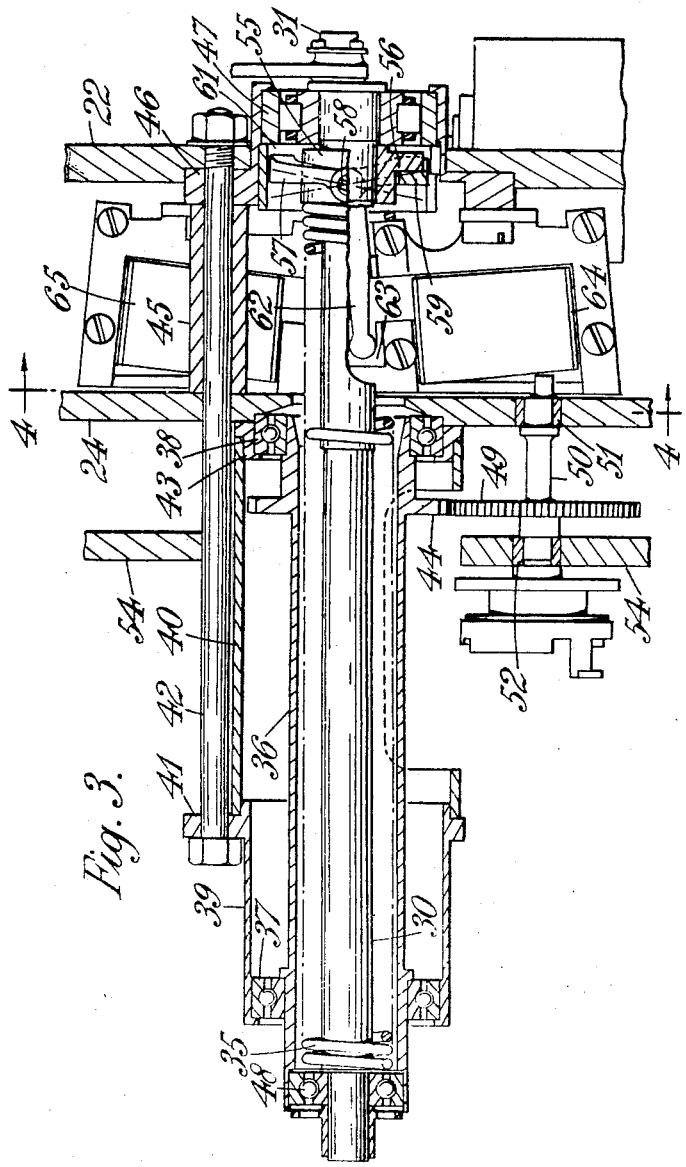
Figure 3 is a section upon the line 3—3 of Figure 2 looking in the direction of the arrows.

The crank spindle 30 behind the plate 22 of the shutter is surrounded by a helical spring 35 enclosed in a sleeve 36 (Figure 3). The sleeve 36 is supported in ball bearings 37, 38 carried in a fixed supporting casing made in two parts 39, 40. The part 40 of the casing consists of a large metal tube partly cut away on one side abutting against a flange 41 on the part 39 of the casing which fits against it. The flange 41 and the two parts of the casing are drawn toward the plate 22 by three equi-distantly spaced bolts 42 which pass through the plate 22. The end of the casing 40 contains a ring 43 which holds the ball bearing 38 against the plate 24 (part of the rear casing 24) which is spaced from the plate 22 by spacing sleeves 45 and by a ring shaped member 46 which passes through the plate 22 and carries a roller bearing 47 for supporting the spindle 30. The other end of the spindle is supported in a ball bearing 48 in the end of the rotatable spring case 36.

Figure 1:
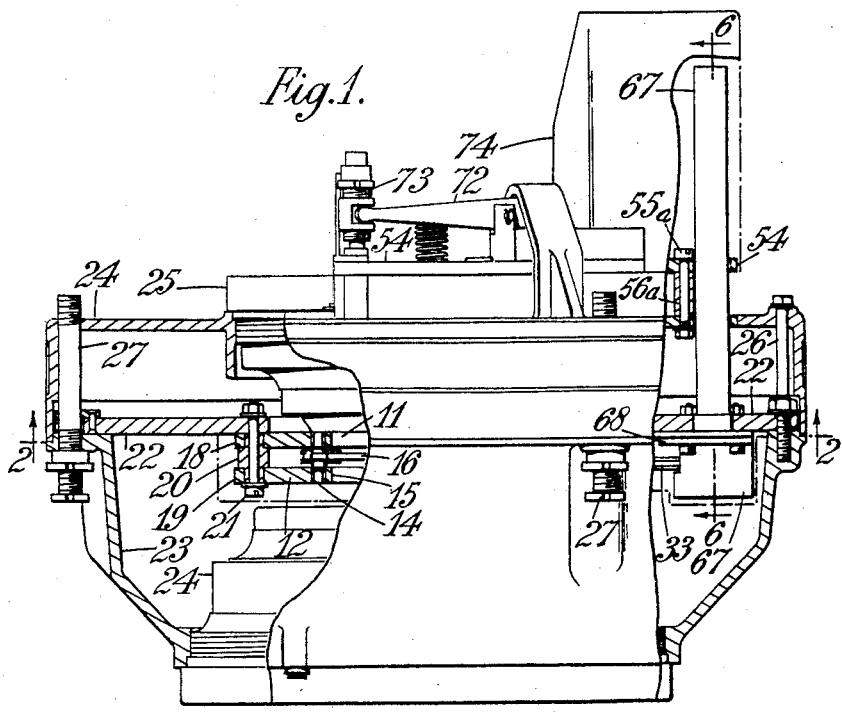

The rotatable spring case 36 carries a pinion 44 which meshes with a gear 49 on a spindle 50 forming part of a motor drive for winding up the shutter. The spindle 50 runs in bearings 51 in the plate 24 and 52 in a second plate 54 which is supported parallel to and behind the plate 24 and secured thereto by bolts 50a and spacers 56a. The latter is seen in Figure 1 of the drawing. It will be understood that the end of the spring 35 which is nearest to the crank pin 31 is secured to the spindle 30, and the end of the spring 35 which is nearest to the ball race 48 is secured to the casing 36. The train of gears which operates the gear-wheel 49 is connected to a small electric operating motor (not shown) and the crank spindle 30 is connected to a known switch mechanism by which as soon as the spring 35 is unwound, by one revolution, the motor is set in motion to wind it up again. Thus the spring is kept constantly wound up to operate the crank through one revolution.

The end of the spring 35 which is nearest to the crank pin 31 is secured to a collar 55 fast on the spindle 30. The collar carries a radial stop abutment 56 and it is surrounded by a pivoted annular release cam 57. The release cam 57 is pivoted on pins 58 which project inwardly from the interior thereof of the ring shaped member 46. The release cam 57 is shaped as shown in the detail Figure 5 so that it has two abutments 59, 60 either of which can be brought into line with the stop-arm 56 by canting the cam 57 about the pivot pins 58. Thus if the spring 35 is wound up and the abutment 59 is in engagement with the stop-arm 56, as shown in Figure 3 of the drawing, the crank pin 31 would be held from rotation, but if the release cam 57 is canted over into the position shown in chain lines at 61 of Figure 3, the stop-arm 56 will be freed from the abutment 59 and the crank pin 31 will be able to make half a revolution under the impulse of the spring 35 until the stop-arm 56 comes in contact with the abutment 60 of the release cam 57. The crank pin cannot make a further half revolution (which would close the shutter) until the release cam 57 is rocked back to the position shown in full lines Figure 3. It will be seen that the act of depressing the release cam on one side will raise it on the other so that the crank pin can be released only half a revolution at a time. On one side the release cam carries an operating arm 62 on which is mounted an armature 63 to play between two holding magnets 64, 65. The opening of the shutter is, therefore, secured by de-energising the magnet 65 and its closing again by de-energising the magnet 64. As will be obvious, if the shutter operating spring 35 is made strong enough to rotate the crank 31 at such a speed that the blades 13 will open fast enough for the maximum shutter speed, and if the shutter is a large one, so that the blades are somewhat heavy, there will be a great amount of energy imparted to the blades throughout the half revolution of the crank, and at the termination of the half revolution of the crank, and at the termination of the half revolution there will not only be a very heavy blow on the stop-member 56 of the spindle 30, but the crank pin will be moving at such a speed that the deceleration imparted at the dead centre to the rocking lever and movable blade-operating member, will be very high. The life of the shutter under these conditions will be short.

However, the rocking arm 33 which has been referred to is according to the present invention firmly secured to the end of a torsion-member 67 (Figures 1 and 2), which acts as its pivot and a detail of which is indicated in Figure 6 of the drawing. The torsion-member extends out behind the plate 22 of the shutter in a direction parallel with the spindle 30. The torsion member consists of a base flange 68 to which is secured an outer torsion tube 69 extending rearwardly for a substantial distance and united at its outer end to an inner torsion rod 70. The inner torsion rod 70 extends forwardly towards and through the plate 22 terminating in a roller bearing 71 which is housed in a cap 72a secured to the base plate 68. The inner torsion rod 70 is united with the rocking arm 33 close to and just rearwards of the roller bearing 71. The two torsion elements 69, 70 are made of such stiffness that they act as a very stiff spring which exerts no force on the mechanism in the mid-position of the rocking arm 33. As the arm 33 is rocked to one extreme or the other of this movement the torque elements 69, 70 exert a strong twisting action upon it, tending to centre it. Thus, when the shutter-blades 13 are closed, as shown in Figure 2 of the drawing, and the crank 31 is at its inner dead centre as shown, the torque tubes are wound up and exerting a strong effort in the direction of opening the shutter blades, which effort is resisted by the crank pin, rotation of which is prevented by the release cam 57.

Upon magnetic release of the cam 57, the helical spring 35 will move the crank pin 31 from its dead centre and immediately the torque tubes assist the movement, so accelerating the opening of the shutter-blades and bring them up to maximum speed at about the centre of their travel. As the blades continue to open on further rotation of the crank, the torque tubes resist the movement and absorb the kinetic energy of the blades so that when the half revolution of the crank is completed and the torque elements 69, 70 are fully wound up in the opposite direction, there is very little energy left in the moving parts and the stop arm 56 comes comparatively gently to rest against the abutment 60 of the cam 57. The instant the cam 57 is canted over again to permit the shutter to close, the helical spring presses the crank pin 31 away from its dead centre and the torque tubes 69, 70 cause the shutter blades to close again equally quickly, the movement again terminating without undue shock.

As will be evident the spring 35 needs only to be strong enough to move the crank pin 31 past its dead centre and to provide the requisite energy to overcome the friction of the parts. The greater part of the accelerating force for the blades is derived from the torque tubes.

While this mechanism might be employed on any size of camera shutter, it is of particular service in shutters such as those used on aerial survey work, where opening and closing efficiencies of a very high order form part of the requirements; hitherto limitations have been found in the mechanical functions where mounting inertia forces have only been offset with added complication and the possible reduction in effective working life. Not only is the tendency towards larger and faster shutters where the inertia problems increase by approximately the fourth power in relation to their size, but also towards phenomenal exposure times in the smaller range of shutters. Under such requirements, the ordinary spring trip mechanism becomes impossible, whereas the mechanism according to the present invention will operate satisfactorily.

It will be appreciated that, while a helical spring has been described as a means for relating a crank and so operating the shutter, any other means for the purpose could be adopted, such for example as an electro-magnetic device or a hydraulic or pneumatic device or means whereby stored energy from a fly-wheel or the like can be applied to move the parts. Further, instead of a torque tube assembly a leaf spring or other centering device could be employed.

In Figure 1 of the drawing there is shown a lever 72 which is operated by a rotatable screw 73 and which is connected to mechanism for altering the speed of the shutter. For this purpose the shutter mechanism described is connected to an escapement device. Such devices are well-known per se and are not herein described as they do not form part of the invention. The operating parts of the shutter where they project behind the plate 54 are enclosed in a casing 74.

I claim:

1. A photographic camera shutter comprising a body having a shutter-opening therein, shutter blades pivoted at the sides of the opening to swing over the opening to close it, torsion means mounted for rotation in opposite directions to store up kinetic energy and rotation back to its point of origin to give off said kinetic energy, a rocking member operatively connected to said blades, means including a rotatable spindle operatively connected to said member for rocking said member and moving said blades through initial, intermediate and terminal stages to open and closed positions, a stop abutment on said spindle, a release cam surrounding said spindle and having two spaced-apart stop abutments thereon disposed in the path of movement of said stop abutment on said spindle and pivotally mounted on said body, means for canting said release cam on its pivot in opposite directions for alternately moving one of the release cam stop abutments out of the path of the spindle stop abutment to permit partial rotation of the spindle and to bring the spindle stop abutment into engagement with the other release cam stop abutment to arrest further rotation of the spindle, and an operative connection between said rocking member and said torsion means so that during the initial stages of the opening and closing movements of the rocking member the torsion means gives off its stored up kinetic energy to assist the opening and closing movements of the blades during the initial stages, the effect of the torsion means on the rocking member being negligible during said intermediate stages of movement and said kinetic energy being stored up in the torsion means during said terminal stages of movement, said torsion means being held against rotation back to said point of origin by engagement of said stop abutments.

2. A photographic camera shutter comprising a body having a shutter-opening therein, shutter blades pivoted at the sides of the opening to swing over the opening to close it, torsion means capable of rotation in opposite directions to store up kinetic energy and rotation back to its point of origin to give off said kinetic energy, a rocking member operatively connected to said blades, means operatively connected to said member for rocking said member to move said blades through initial, intermediate and terminal stages to open and closed positions, an operative connection between said rocking member and said torsion means so that during the initial stages of the opening and closing movements of the rocking member the torsion means gives off its stored up kinetic energy to assist the opening and closing movements of the blades during the initial stages, the effect of the torsion means on the rocking member being negligible during said intermediate stages of movement and said kinetic energy being stored up in the torsion means during said terminal stages of movement, cooperating stop means on said body and said rocking member rocking means for preventing said torsion means from rotating back to its point of origin so that said stored kinetic energy cannot be released, and release means on said body for releasing said stop means.

3. A photographic camera shutter as claimed in claim 2, wherein said torsion means comprises one element fixed to said body and a second element united at one end to said first element for rotation with respect thereto, said second element being secured to the operative connection between said rocking member and said torsion means.

References Cited in the file of this patent
UNITED STATES PATENTS

| | | |
|---|---|---|
| 1,626,032 | Fairchild | Apr. 26, 1927 |
| 2,321,361 | Chappell et al. | June 8, 1943 |
| 2,463,206 | Robertson | Mar. 1, 1949 |

FOREIGN PATENTS

| | | |
|---|---|---|
| 923,506 | France | Feb. 17, 1947 |